Oct. 1, 1968 F. W. FENTON 3,403,697
SAFETY VALVE
Filed Sept. 4, 1964
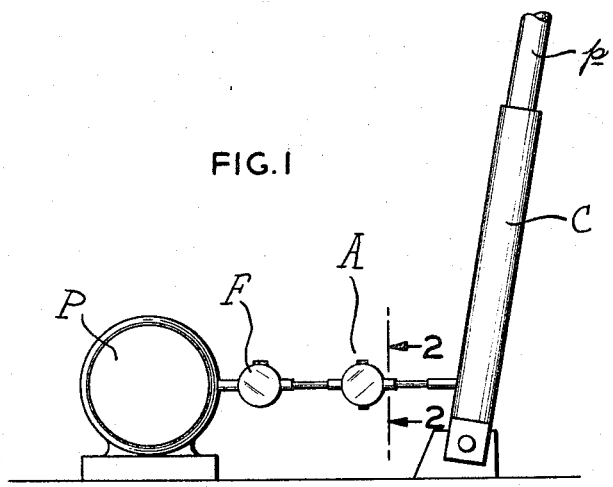
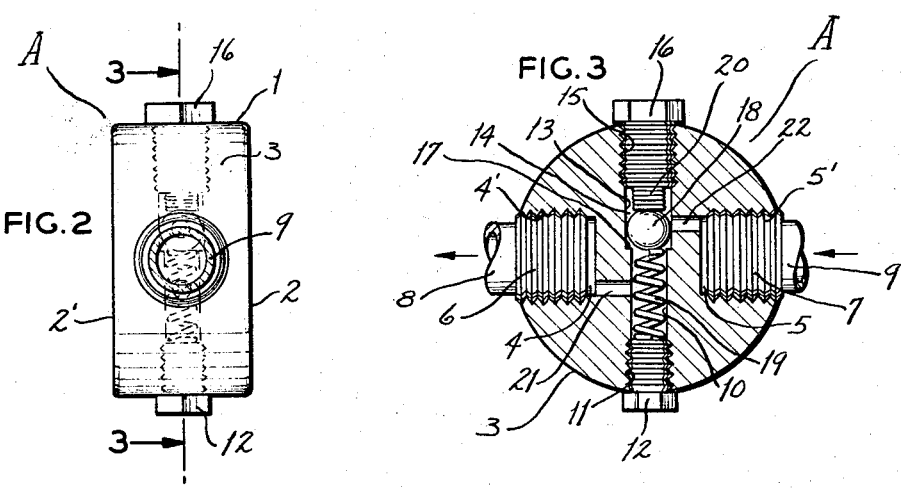
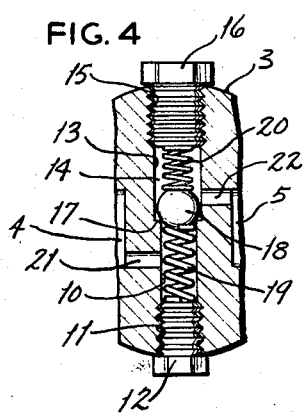
INVENTOR.
FRANK W. FENTON
BY Ralph W. Kalish
ATTORNEY

United States Patent Office 3,403,697
Patented Oct. 1, 1968

3,403,697
SAFETY VALVE
Frank W. Fenton, Mehlville, Mo., assignor to Beacon Machinery, Inc., Mehlville, Mo., a corporation of Missouri
Filed Sept. 4, 1964, Ser. No. 394,557
3 Claims. (Cl. 137—517)

This invention relates in general to fluid systems and, more particularly, to a safety valve for incorporation therein.

It is an object of the present invention to provide a safety valve for use in fluid systems which is adapted to withstand elevated fluid pressures for preventing premature releasing flow under sudden unexpected applied forces.

It is another object of the present invention to provide a safety valve of the character stated which is of cylindrical configuration, whereby substantial applied pressures may be evenly distributed throughout the valve body.

It is a further object of the present invention to provide a safety valve for use in fluid systems which is of simple construction and comprises but a limited number of components for resistance to a breakdown.

It is another object of the present invention to provide a safety valve of the type stated which may be easily incorporated in existing fluid systems without requiring extensive or costly modification thereof.

It is an additional object of the present invention to provide a safety valve for use in fluid systems which is highly durable and reliable in operation; which provides a safety factor hitherto unknown in systems of this type; and which may be most economically produced.

Other objects and details of the present invention will be apparent from the following description when read in connection with the accompanying drawing, wherein FIGURE 1 is an end view of a hydraulic system incorporating a safety valve constructed in accordance with and embodying the present invention.

FIGURE 2 is an end view of the safety valve taken along the line 2—2 of FIGURE 1.

FIGURE 3 is a vertical transverse sectional view taken along the line 3—3 of FIGURE 2, and showing the ball valve in open position.

FIGURE 4 is a vertical transverse sectional view taken substantially along the line 3—3 of FIGURE 2, and showing the ball valve in closed condition.

Referring now by reference characters to the drawing, which illustrates the preferred embodiment of the present invention, A generally designates a safety valve comprising a cylindrical body 1, which may be integrally cast from suitable metal, having a pair of parallel circular end faces 2, 2', separated by an annular side face 3.

Said body 1 is provided with a pair of recesses, 4, 5, axially aligned and being coaxial with the transverse diameter of said body 1, said recesses 4, 5 extending inwardly from opposed portions of side wall 3 and terminating spacedly from each other equidistant from the vertical axis of said body 1. Said recesses 4, 5 are internally threaded as at 4', 5', respectively, for engagement to threaded fittings 6, 7, respectively, provided on the end of conduits 8, 9, respectively, connecting said valve A with a fluid pump P and a fluid cylinder C, respectively, said latter having a piston p. Provided between safety valve A and pump P is a flow control valve F which is of the type set forth in co-pending application Ser. No. 386,565, filed July 31, 1964. Thus, said valve A is located between the source of fluid for the system and the operating cylinder, being a part of the path of fluid flow.

Said valve body 1 is provided with a vertically extending bore 10 extending from the upper face to the opposed lower face of side wall 3 and being coaxial with the vertical diameter of said body 1. Said bore 10 at its lower end is threaded as at 11 for engagement with the external threads of closure plug 12. Bore 10 in its upper portion, above the transversed diameter of said valve body 1, is counter-bored as at 13 for developing a chamber 14 which latter, at its upper end, is internally threaded as at 15 for receiving the threaded stem of a closure plug 16. The lower end of chamber 14 opens into bore 10 and is provided with a circumferential shoulder 17 constituting a valve seat for a ball valve 18 disposed in chamber 14.

Bearing against the inner end face of closure plug 12 is one end of a coil spring 19 which, at its other end, bears against the lower face of ball valve 18 for biasing same upwardly away from valve seat 17 into valve-open condition; said spring 19 thus being adapted for extension into chamber 14. Bearing against the under or lower face of closure plug 16 is a coil spring 20, the lower end of which bears against the upper face of ball valve 18. Spring 19 is of relatively increased strength with respect to spring 20 so as to overcome the bias thereof in urging ball valve 18 into open condition.

Extending between recess 4 and bore 10, below chamber 14 is a relatively narrow passage 21, the axis of which is parallel to but downwardly spaced from the axis of said recess 4; said passage 21 providing a flow path for fluid moving from pump P toward chamber 14 and for return flow therefrom. Connecting the lower end portion of chamber 14 with the upper portion of recess 5 is a passage 22 which is axially parallel to passage 21, but being presented upwardly thereof and on the opposite side of the horizontal as well as vertical axis of said valve body 1. Thus, passage 22 provides communication between chamber 14 and recess 5 for fluid flow to and from cylinder C.

It will be understood that piston p of cylinder C may be utilized for effecting the elevation of any well-known type of device such as, for instance, dock ramps as utilized in the materials handling field for bridging the distance between loading and unloading platforms and the beds of trucks. The particular device operated by cylinder C does not form a part of the present invention, but reference is made thereto merely for purposes of illustrating the operation of safety valve A.

In operation, upon actuation of the fluid system, fluid will be pumped from a supply tank by pump P through conduit 8, passage 21 and into bore 10, thence upwardly into chamber 14 and then outwardly through passage 22 and conduit 9 for entry into cylinder C to effect movement of piston p. Spring 19 will thus serve to maintain ball valve 18 away from seat 17 so that fluid will smoothly flow into cylinder C. After the pumping operation has been terminated, piston p will be extended the desired distance so as to present the device operated thereby, such as a dock ramp, in requisite position. The dock ramp thus will be maintained in working position by the pressure of the fluid in cylinder C. However, in the event the dock ramp is subjected to an accidental but relatively strong depressing force, which overcomes the pressure of fluid in cylinder C, piston p would be forced downwardly causing fluid to flow through safety valve A for attempted return to the supply tank. However, since such fluid will be under relatively great pressure, the surge thereof will operate against ball valve 18 to cause same to be driven downwardly into valve closing condition upon valve seat 17. Thus, such surge of pressure will overcome spring 19, permitting ball valve to seat. As the valve is thus closed, the fluid forced into chamber 14 will continue to operate against ball valve 18 to maintain same in closed condition.

Thus, the operation of safety valve A prevents the undesired premature return flow of fluid to the supply tank by reason of the application of an unexpected force acting upon the device operated by piston p as for instance a dock ramp. Safety valve A thus acts to prevent the collapsing of a fluid operated agency by receiving a greater force than designed and thereby assures continued operation of the device as well as preventing injury to person and damage to property which would necessarily follow if safety valve A were not incorporated in the system.

Ball valve 18 may only be returned to valve-open position upon actuation of pump P for causing flow of fluid toward cylinder C whereby ball valve 18 will be forced upwardly under the pump pressure which latter will overcome the force of the pressure of fluid operating against the upper portion of ball valve 18.

Although the myriad advantages presented by use of the present invention should be quite apparent, note may be taken of a particular condition which is continuously encountered in every day operation and which is successfully resisted by valve A. Reference is thus made to the situation wherein a lift truck is driven onto an extended dock ramp by which condition the substantial weight of the lift truck together with the driver and conceivably supported load, causes a downward force upon the dock ramp which would normally give way under such added stress with consequent damage to the truck and injury to person. However, with the present invention the force of the lift truck is immediately and effectively resisted by valve A upon closing so that fluid is retained in cylinder C for preventing accidental depressing of the dock ramp.

The cylindrical character of valve A, being circular in cross-section, is of marked criticality, as such constitutes a departure from safety valves heretofore known. This novel configuration of valve A permits said valve to withstand pressures of considerably greater amounts than those for which presently used valves are adapted. It is believed that the circular character of valve A permits of an even distribution of the applied pressure, so that all parts of the same are under a like force.

The present invention can be readily incorporated in existing fluid systems, whether pneumatic or hydraulic, without necessitating extensive alternation or modification of the same, and can be most economically manufactured.

It should be understood that changes and modifications in the formation, construction, arrangement, and combination of the several parts of the Safety Valve may be made and substituted for these herein shown and described without departing from the nature and principle of my invention.

Having thus described my invention, what I claim and desire to secure by Letters Patent is:

1. For use in a fluid system having a fluid pump and a fluid operated cylinder, a safety valve comprising an integrally formed cylindrical body having opposed circular end faces and an intervening circumferential side face, said body having a bore extending diametrically through said side face, said body further having diametrically opposed axially aligned, outwardly opening first and second recesses extending inwardly in said side face, said first and second recesses being in axially normal relationship to said bore and terminating spacedly therefrom, said first recess being connected to said fluid pump, said second recess being connected to said fluid operated cylinder, said bore being counterbored to provide a valve chamber, a valve seat formed at the inner end of said chamber, a valve disposed in said chamber, said first recess having a first passage connected to said bore below said valve seat, said second recess having a second passage connected to said valve chamber upwardly of said valve seat, the axis of said first passage being parallel to, and downwardly spaced from, the axis of said first recess, the axis of said second passage being parallel to, and upwardly spaced from, the axis of said second recess, means biasing said valve upwardly and away from said seat into open condition for fluid flow between said first and second recesses, there being a normal predetermined fluid line pressure between said fluid pump and said fluid operated cylinder when the latter is in operative position, said valve being urged into closed condition upon said valve seat when said pressure in the system between said fluid cylinder and said fluid pump is increased beyond said normal predetermined line pressure.

2. For use in fluid systems, a safety valve as defined in claim 1 and further characterized by said valve biasing means comprising a first spring provided in said bore for extension into said chamber for biasing said valve into open condition, a second spring provided in said chamber and urging said valve into closed condition, said first spring being stronger than said second spring.

3. For use in fluid systems, a safety valve as defined in claim 1 and further characterized by a first closure plug provided at the outer end of said bore and a second closure plug provided at the outer end of said valve chamber, said first and second springs bearing at their outer ends against said first and second closure plugs, respectively.

References Cited
FOREIGN PATENTS

| | | |
|---|---|---|
| 6,097 | 2/1927 | Australia. |
| 721,108 | 5/1942 | Germany. |
| 90,567 | 4/1954 | Norway. |
| 13,035 | 1914 | Great Britain. |
| 22,029 | 1897 | Great Britain. |

WILLIAM F. O'DEA, *Primary Examiner.*

H. M. COHN, *Assistant Examiner.*